M. A. THOMSHAW.
NUT LOCK.
APPLICATION FILED OCT. 15, 1910.
996,540.
Patented June 27, 1911.
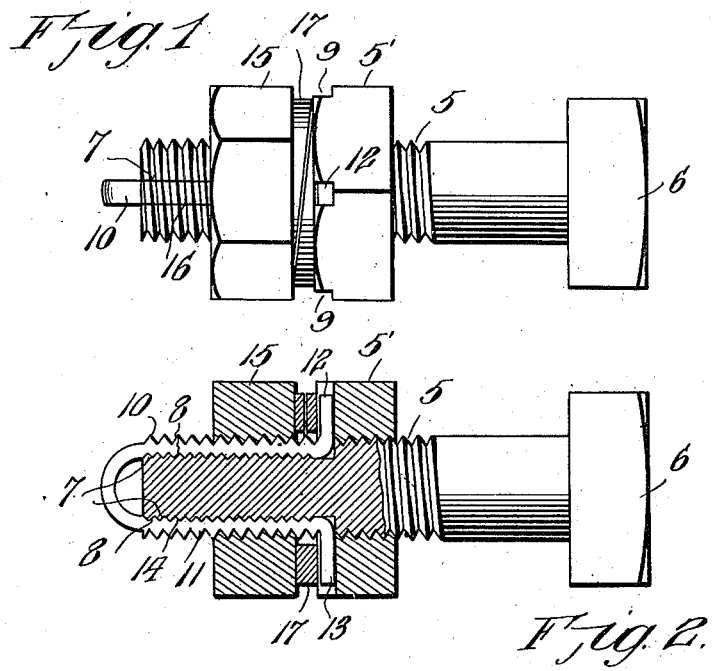
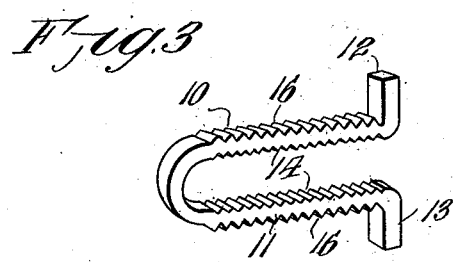
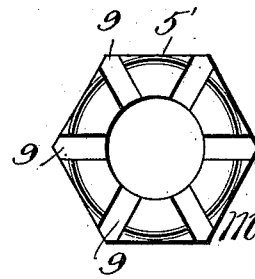
Witnesses
Frank Hugh
John A. Donegall
Inventor
Michael A. Thomshaw,
By Victor J. Evans
Attorney

UNITED STATES PATENT OFFICE.

MICHEAL A. THOMSHAW, OF VINTONDALE, PENNSYLVANIA.

NUT-LOCK.

996,540.  Specification of Letters Patent.  Patented June 27, 1911.

Application filed October 15, 1910. Serial No. 587,303.

*To all whom it may concern:*

Be it known that I, MICHEAL A. THOMSHAW, a citizen of the United States, residing at Vintondale, in the county of Cambria and State of Pennsylvania, have invented new and useful Improvements in Nut-Locks, of which the following is a specification.

This invention relates to improvements in nut locks and has for its object the provision of a specific form of bolt, nut and locking member coöperating to lock the nut against rotation when positioned on the bolt.

Another object is the provision of a jam nut used in addition to the locked nut and a spring washer interposed between the locked nut and jam nut and adapted when sufficiently tensioned to exert sufficient pressure on the jam nut to prevent accidental turning of the same on the bolt.

With these and other objects in view which will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size, and minor details of the device may be made, within the scope of the appended claims, without departing from the spirit or sacrificing any of the advantages of the invention.

In the accompanying drawings, forming part of the specification;—Figure 1 is a side elevation of the device. Fig. 2 is a longitudinal sectional view of the same. Fig. 3 is a detail perspective of the locking member. Fig. 4 is an end view of the nut to be positively locked.

Similar numerals of reference are employed to designate corresponding parts throughout.

The bolt comprises a threaded shank 5 terminating at one end in a head 6. The shank 5 is provided with oppositely positioned longitudinal channels 7, the floors of which are provided with teeth or notches 8, the function of which will appear later.

The nut to be positively locked is preferably of the hexagonal type and of a size to receive the shank 5 of the bolt. The outer face of the nut 5' is provided with a plurality of diametrically opposed transverse notches 9.

The locking member is preferably formed of a single piece of metal bent into substantially a U-shape, the opposite limbs of which are designated by the numerals 10 and 11, the free end portions of the said limbs being bent outwardly as shown at 12 and 13. The locking member is designed to straddle the bolt and when so positioned the limbs 10 and 11 of the locking member will be arranged in the channels 7. The inner surfaces of the limbs 10 and 11 are provided with a plurality of teeth 14 to engage with the teeth 8 in the floors of the channels 7, and when so engaging endwise movement of the locking member will be positively prevented.

In the use of the device thus far described the nut is screwed onto the shank 5 after which the locking member is passed over the shank so that the limbs 10 and 11 thereof will enter the channels 7, the said locking member being moved downwardly until the outwardly bent portions 12 and 13 thereof enter oppositely disposed notches in the outer face of the nut. It will be seen when the parts are in these positions that turning movement of the nut in either direction will be positively prevented.

In order that the locking member may be retained against accidental displacement a jam nut 15 is provided. It will be seen now by reference to the drawings that the outer surface of the limbs 10 and 11 of the locking member are provided with threads 16 to form continuations of the interrupted threads of the bolt. With this construction it will be manifest that the jam nut may be screwed onto the bolt, its threads engaging with the threads of the locking member. By reference now to the drawings it will be seen that positioned between the jam nut and the first-described nut is a split washer 17, the opposite end portions of the said washer being tapered and overlapping so that when the said end portions bear one upon the other their combined thicknesses will be substantially the same as the untapered portion of the washer.

In the use of the device and after the locking member is placed in engagement with the nut in a manner before described, the washer is placed over the threaded shank of the bolt until it bears on the notched surface of the first-described nut, after which the jam nut is screwed onto the bolt and into engagement with the split washer. It will be seen that continued movement of the jam nut will force the overlapped ends thereof into engagement, thus tensioning the washer whereby an outward pressure will be exerted on the jam nut sufficiently great to prevent accidental turning of the same on the shank 5.

From the foregoing, it is evident that I have provided a device which is comparatively simple in structure and inexpensive to manufacture, embodying few parts and these so arranged that the danger of derangement will be reduced to a minimum.

I claim:—

1. A nut lock comprising a bolt having in the shank thereof a longitudinal channel the floor of which is provided with teeth, a nut to receive the shank of the bolt and having on its outer face a notch to aline with the channel of the bolt, a locking pin having a shank portion insertible into the channel of the bolt and having on one face thereof a plurality of teeth to engage with the teeth of the said channel, and further provided with an out-turned end portion insertible into the notch of the nut, a spring washer to receive the shank of the bolt, a jam nut to be screwed onto the bolt and coöperating with the first-named nut to tension the washer, for the purpose described.

2. A nut lock comprising a bolt having in the shank thereof a longitudinal channel the floor of which is provided with teeth, a nut to receive the shank of the bolt and having on its outer face a notch to aline with the channel of the bolt, a locking pin having a shank portion insertible into the channel of the bolt and having on one face thereof a plurality of teeth to engage the teeth of the channel and its opposite face threaded to form continuations of the threads of the bolt, and further provided with a bent end portion insertible into the notch of the nut, a spring washer to receive the shank of the bolt, a jam nut to be screwed onto the bolt and coöperating with the first-named nut to tension the washer, for the purpose described.

3. A nut lock comprising a bolt having a shank portion provided with oppositely disposed longitudinal channels the floors of which are provided with teeth, a nut to receive the shank of the bolt and having on its outer face oppositely disposed notches to aline with the channels of the bolt, a substantially U-shaped locking member having its opposite limbs adapted to be inserted into the channels of the bolt, the said limbs having on one face a plurality of teeth to engage the teeth of the channels and their opposite surfaces provided with threads to form continuations of the threads of the bolt, the opposite end portions of said limbs being out-turned and insertible into the notches of the nut, a spring washer to receive the shank of the bolt, a jam nut to be screwed onto the bolt and coöperating with the first-named nut to tension the washer, for the purpose described.

In testimony whereof I affix my signature in presence of two witnesses.

MICHEAL A. THOMSHAW.

Witnesses:
THOMAS McNAMARA,
BENAGAN FRANK LAUDEMAN.

---

Copies of this patent may be obtained for five cents each, by addressing the "Commissioner of Patents. Washington, D. C."